April 3, 1934.  H. W. BLAISDELL  1,953,100
APPARATUS FOR REMOVING SLUDGE
Filed Feb. 1, 1928   4 Sheets-Sheet 1
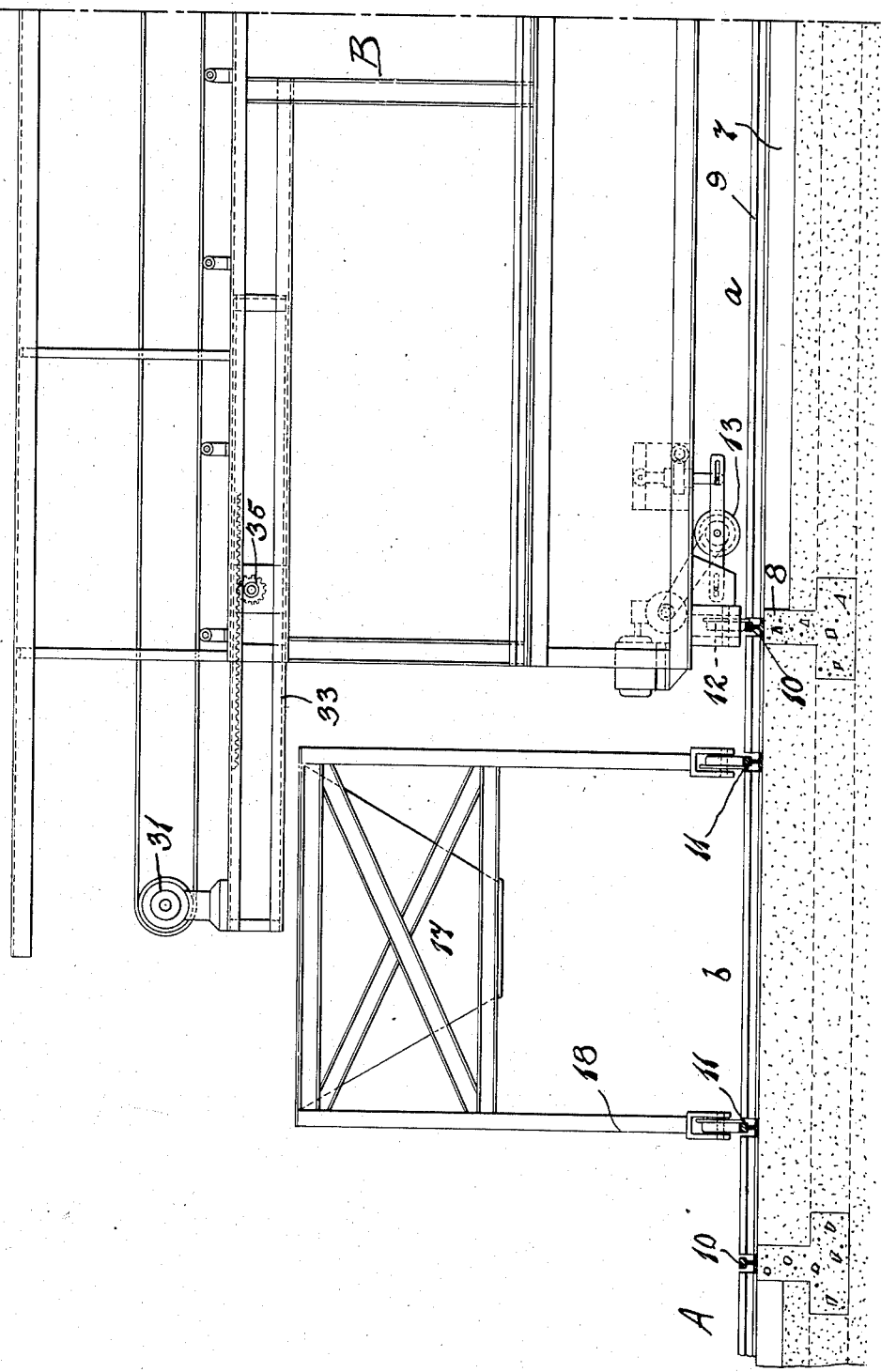

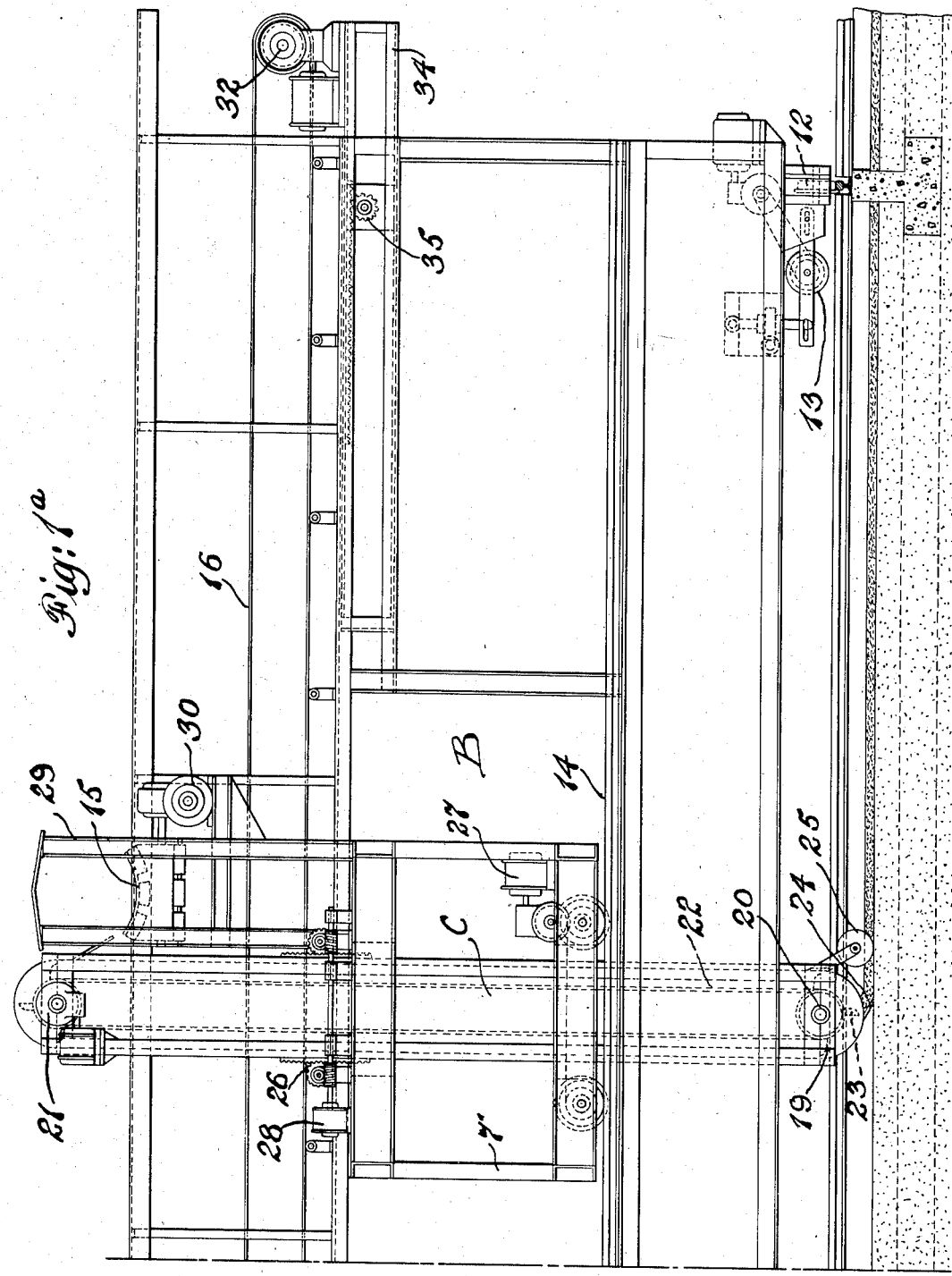

April 3, 1934.  H. W. BLAISDELL  1,953,100
APPARATUS FOR REMOVING SLUDGE
Filed Feb. 1, 1928  4 Sheets-Sheet 3
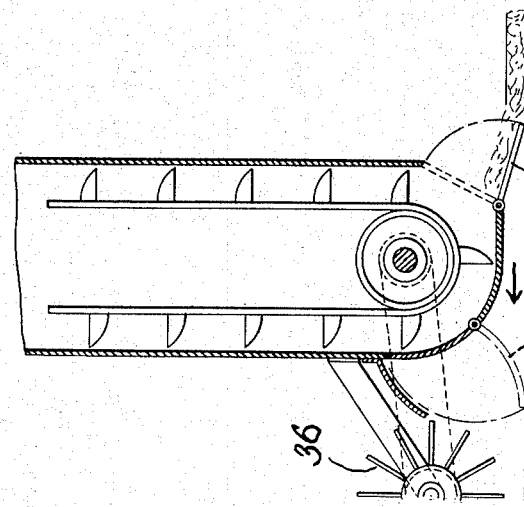
INVENTOR
H. W. Blaisdell
BY
ATTORNEY April 3, 1934.                H. W. BLAISDELL                1,953,100
                        APPARATUS FOR REMOVING SLUDGE
                    Filed Feb. 1, 1928          4 Sheets-Sheet 4

INVENTOR
H. W. Blaisdell
BY
ATTORNEY

Patented Apr. 3, 1934

1,953,100

UNITED STATES PATENT OFFICE 1,953,100

APPARATUS FOR REMOVING SLUDGE

Hiram W. Blaisdell, Philadelphia, Pa., assignor to Alice B. Blaisdell, Philadelphia, Pa.

Application February 1, 1928, Serial No. 251,210

2 Claims. (Cl. 210—3)

This invention relates to method of and apparatus for removing sludge from sludge beds.

Sludge beds cover a very large ground area and include, among other things, a bed of sand upon which the sewage is pumped for drainage and drying. Because of weather and other conditions, the sludge is not always in condition for removal, and the periods of time effectively available for the removal of the sludge from the beds are comparatively short, in consequence of which much difficulty has been encountered in the keeping of the beds in suitable operative condition, particularly in large cities.

Heretofore it has been the practice to lay rails in a section of the bed, the sludge being shoveled by hand into small cars running on such rails. When a strip of sludge has been removed, the track is shifted and the operation repeated. This is costly, and, in addition, involves a time element which is too great as compared with the time ordinarily available for sludge removal for reasons above pointed out.

It is the primary purpose of my invention to overcome these difficulties and to make it possible to expeditiously and economically remove sludge. More specifically it is an object of my invention to make it possible to meet the requirements with a relatively small bed; or, stated in another way, the invention will make it possible to satisfactorily use existing beds, notwithstanding increased tax on their capacity.

How the foregoing, together with such other objects as may hereinafter appear, or are incident to my invention, are realized, is illustrated in the accompanying drawings, wherein—

Figs. 1 and 1a are split views showing, in side elevation, apparatus suitable for carrying out my invention.

Fig. 2 is a partial plan view on a small scale of a typical sludge bed.

Fig. 3 is a fragmentary cross section illustrating a modification of my invention.

Figure 5:
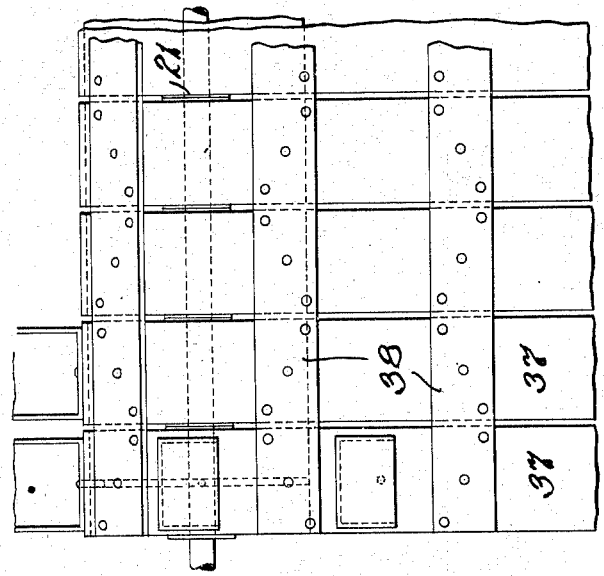
Fig. 5 is a partial side elevation of a detail of the invention.

Referring now to Fig. 2 and Figs. 1 and 1a, the reference character A denotes the sludge bed considered as a whole, such sludge bed being divided by longitudinally extending and cross walls 7 and 8, respectively, into small beds $a$ with a runway or runways $b$ at the ends of the divisions, as, for example, as between sets of the smaller divisions. Rails 9 extend longitudinally of the wall 7 and across the runway and other rails 10 extend along the walls 8, with still other rails 11 extending longitudinally of the runway.

This arrangement of rails permits of the operations to be hereinafter described.

For the removal of the sludge I provide a carrier mechanism indicated as a whole by the reference letter B. This carrier mechanism has sets of wheels 12—12 which are adapted to run along the rails 9. The carrier is also provided with sets of wheels 13—13 which are normally retracted, but which may be depressed to rest upon the rails 10—10 so as to elevate the carrier sufficiently to free the sets of wheels 12. Wheels 13 and 12 are at right angles.

The carrier extends crosswise of a small bed or division and is provided with an elevator mechanism indicated as a whole by the reference letter C which is supported in a small carrier 7' movably carried on rails 14 extending longitudinally of the carrier, whereby the elevator may be moved from one end of the carrier to the other.

The elevator lifts sludge from the bed and discharges on to a cross conveyor 15 by which the lifted sludge is discharged on to the conveyor 16 which extends longitudinally of the carrier and to an edge thereof so as to discharge sludge at an edge of the divisions, say, for example, into a bin 17 mounted on a car 18 which rides upon the rails 11 in the runway. This car 18 may thus be shifted along the runway to an edge of the bed for dumping into trucks or cars or the like.

Referring now more particularly to details of the invention, the elevator C comprises a suitable housing or casing 19 in which are mounted the lower and upper sprockets 20 and 21, respectively, and the endless belts 22 which run over the sprockets and which are provided with buckets 23. At the lower end of the elevator there are fingers 24 which are adapted to lift sludge from the sand bed by a sort of stripping action as the elevator is advanced longitudinally of the carrier. The sludge is thus fed to the sphere of action of the bucket elevators and is raised thereby for discharge on to the cross conveyor 15. In advance of the elevator there are cutters 25 which cut the sludge. The elevator is bodily shiftable vertically, as by means of the rack and pinion mechanism 26, so that it may be brought into operative or inoperative position with respect to the sludge. When the elevator mechanism is shifted upwardly it clears the rails and the walls to permit of shifting of the carrier as hereinafter described. The elevator carrier 7' is driven along the rails 14 by means of a motor 27 suitably drivingly coupled to the elevator carrier wheels. The rack and pinion mechanism is operated by a motor 28.

The cross conveyor 15 is carried in a suitable frame 29 supported from the elevator carrier 7', and is driven by a motor 30.

The conveyor 16 is mounted so as to be bodily shifted longitudinally of the carrier B in order to meet varying operating conditions. To this end the sprockets 31 and 32 of such conveyor are supported on bed frames 33 and 34 which are slidably supported on the main frame of the carrier B and are moved in one direction or the other by means of rack and pinion mechanism 35. By this arrangement the longitudinal conveyor 16 may be shifted so as to project beyond the carrier B to any desired extent as may be required.

The operation of the parts thus far described is as follows: The carrier B is shifted over a division and the elevator is moved to one end of the carrier, depressed, and then advanced toward the other end, removing a strip of the sludge. The elevator is now returned to its initial position, elevated, if required, and the carrier B is then shifted longitudinally of the rails 9—9 and another strip of sludge is removed, the operation being repeated until all of the sludge of the particular division is removed.

The wheels 13 are then depressed so that they support the carrier and so that the wheels 12—12 are clear. Thereupon the carrier is shifted to the next section, the elevator being moved upwardly to secure the necessary clearance.

The operation is then repeated.

It will be readily seen that the carrier may be shifted across a runway so as to operate upon an adjacent set of divisions.

If desired, the elevator may be constructed so as to operate upon the sludge bed in both directions. A suitable arrangement for this purpose is shown in Fig. 3, from an inspection of which it will be seen that there are two sets of fingers 24 provided for engagement with the sludge. When the elevator is moving in one direction, one set of fingers is lowered into operative position and the other set of fingers is raised. Inasmuch, however, as the belt moves in one direction, it may be desirable to provide an additional feeding means as indicated at 36 for feeding the sludge positively into the elevator casing when the elevator is being moved in the direction indicated by the arrow in Fig. 3.

As a substitute for the arrangement of Fig. 3, a pair of oppositely working elevators C' and C² may be employed, the one being lifted to inoperative positon when the other one is working.

Figure 6:
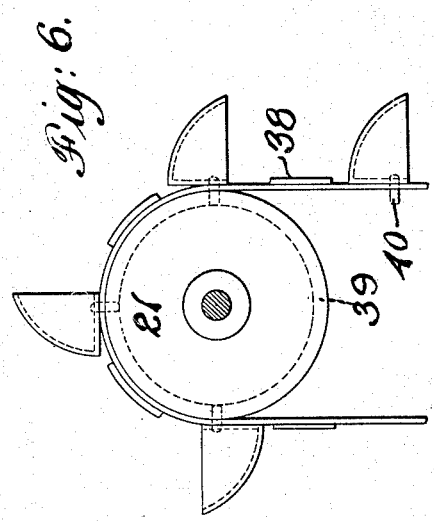
Fig. 6 is a partial end view of the part shown in Fig. 5.
Figure 4:
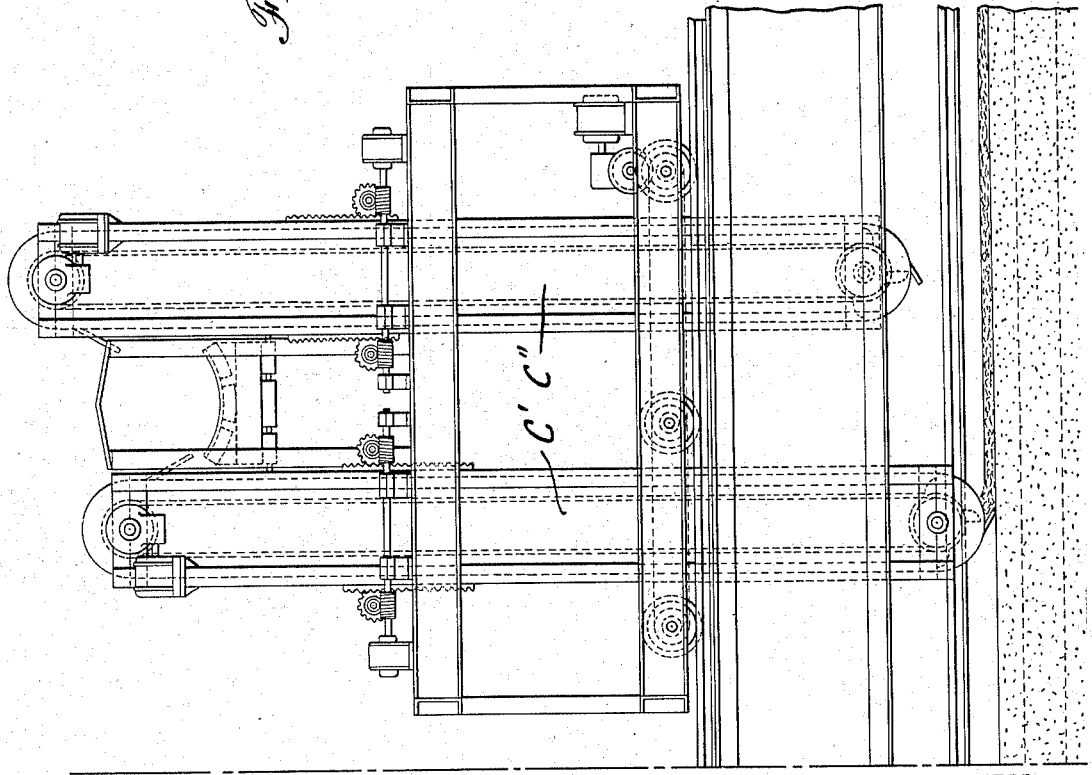
Fig. 4 is a side elevation of a modified form of a portion of the apparatus which I employ.

Referring now to Figs. 5 and 6, the elevator bucket mechanism is illustrated. I prefer to employ a plurality of endless belts 37 running over the pulleys 20 and 21. These belts I tie together by transverse pieces 38 so that all of the belts operate as one. To prevent longitudinal shifting of the belts with reference to the pulleys, either or all pulleys may be provided with one or more annular grooves 39 adapted to be engaged by means such as fins 40 positioned, for example, to the buckets or belts or an intermediate piece. The stripping fingers 24 are arranged like the tines of a fork or pitchfork and lift the sludge without lifting any sand, save such as adheres to the sludge itself.

I claim:—

1. In combination with a sludge bed having a bed of sand and marginal retaining walls projecting above the bed, of a sludge removal apparatus supported on said walls for movement therealong, said apparatus having a vertical conveyor movable lengthwise of the apparatus, a boot for the conveyor having an inlet opening at each of two opposite sides to receive sludge, sets of fingers on the boot adjacent two inlets adapted to engage the under face of the sludge and lift it into the boot through said inlets to the sphere of action of the conveyor, means for closing each inlet opening in the boot according to the direction of movement of the vertical conveyor and a longitudinally extending substantially horizontal conveyor to which the vertical conveyor delivers.

2. Sludge disposal apparatus including a basin, a sand bed in the basin adapted to receive a layer of sludge so as to absorb moisture therefrom and provide for evaporation of moisture therefrom to the atmosphere, the basin having upright walls projecting above the upper surface of the sand bed, and sludge removal mechanism carried by said side walls and overlying the sand bed and sludge layer in the basin, said mechanism including conveyor means extended for discharge laterally beyond an edge of the basin, a conveyor unit extended downwardly from said conveyor means to a point closely adjacent the layer of sludge adapted to be received on the sand bed, the conveyor unit being movable generally horizontally across the sand bed and including a casing or boot for movable parts of the conveyor unit with an inlet opening adjacent its lower end, and pick-up fingers projecting downwardly from a lower portion of said boot and terminating substantially in the plane of the upper surface of said sand bed, said fingers being positioned adjacent said inlet opening and being adapted to lift the sludge into the boot through the said inlet opening to the sphere of action of the movable conveyor parts in the boot, whereby to provide for the drying and removal of one layer of sludge after another without disturbing the sand bed.

HIRAM W. BLAISDELL.